United States Patent
Lior

(10) Patent No.: US 12,228,070 B2
(45) Date of Patent: Feb. 18, 2025

(54) RECONFIGURABLE HYBRID SOLAR GAS TURBINE SYSTEM OPERATING IN A SEMI-OPEN CYCLE

(71) Applicant: TURBOGEN LTD., Ramat Gan (IL)

(72) Inventor: David Lior, Herzliya (IL)

(73) Assignee: TURBOGEN LTD., Ramat Gan (IL)

(*) Notice: Subject to any disclaimer, the term of this patent is extended or adjusted under 35 U.S.C. 154(b) by 0 days.

(21) Appl. No.: 18/280,231

(22) PCT Filed: May 25, 2021

(86) PCT No.: PCT/IB2021/054532
§ 371 (c)(1),
(2) Date: Sep. 3, 2023

(87) PCT Pub. No.: WO2022/248910
PCT Pub. Date: Dec. 1, 2022

(65) Prior Publication Data
US 2024/0167416 A1    May 23, 2024

(51) Int. Cl.
*F02C 1/05*    (2006.01)
*F02C 1/08*    (2006.01)
*F02C 3/34*    (2006.01)
*F03G 6/06*    (2006.01)

(52) U.S. Cl.
CPC .......... *F02C 1/05* (2013.01); *F02C 1/08* (2013.01); *F02C 3/34* (2013.01); *F03G 6/064* (2013.01)

(58) Field of Classification Search
CPC ...... F02C 1/05; F02C 1/08; F02C 3/34; F02C 6/12; F02C 6/00; F03G 6/064; F05D 2220/07
See application file for complete search history.

(56) References Cited

U.S. PATENT DOCUMENTS

| | | | |
|---|---|---|---|
| 10,808,685 B2* | 10/2020 | Conlon | F01K 7/16 |
| 10,982,570 B2* | 4/2021 | Conlon | F01K 11/02 |
| 2005/0056021 A1* | 3/2005 | Belokon | F02C 9/32 60/734 |
| 2006/0174622 A1* | 8/2006 | Skowronski | F02C 6/18 60/641.8 |
| 2019/0301749 A1* | 10/2019 | Houssainy | F01K 23/06 |

(Continued)

FOREIGN PATENT DOCUMENTS

WO    WO-2020068011 A1 *    4/2020    ............ F01D 19/00

*Primary Examiner* — J. Todd Newton
(74) *Attorney, Agent, or Firm* — Rivka Friedman

(57) ABSTRACT

A reconfigurable hybrid solar gas turbine system includes a turbocharger (TC), a gas turbine engine, and a solar energy module. The TC and engine each include a compressor and a turbine joined by a turboshaft. The engine further includes a burner, a mixer, a generator, and a flow control valve. The system operates in a semi-open cycle in which the TC receives inlet ambient air. The burner receives pressurized air from the TC and fuel, for example from an NG source. The mixer combines hot gas flows from both the burner and the solar energy module to form a combined flow, whose mixing ratio is determined by a position of the flow control valve, thereby reconfiguring the system in response to variations in incident solar irradiance. Electrical power is generated by the engine generator and an optional TC generator. The engine and/or solar energy module may include a recuperator.

18 Claims, 5 Drawing Sheets

(56) References Cited

U.S. PATENT DOCUMENTS

| | | | | |
|---|---|---|---|---|
| 2022/0412261 A1* | 12/2022 | Lior | .......................... | F02C 7/18 |
| 2023/0243600 A1* | 8/2023 | Lotfalian | ................ | F01K 25/10 |
| | | | | 165/10 |
| 2024/0167416 A1* | 5/2024 | Lior | .......................... | F02C 6/00 |

* cited by examiner

FIG. 2

SEMI-open AIR PRESSURIZED LOW POLLUTION GASTURBINE PERFORMANCE

NOx=5 ppmv

PRODUCTION OF CO and other unburned hydrocarbons

EICO=1.08 GR EMISSION PER KG FUEL

| | W | T | P | Wfuel | | | | | | | |
|---|---|---|---|---|---|---|---|---|---|---|---|
| Station: | kg/s | K | kPa | kg/s | | PMSD | = | 128.9 kW | | | |
| amb | 303.00 | 303.000 | | | | | | | | | |
| | | | | | | PRC | = | 0.2080 kg/(kW*h) | | | |
| 1 | 1.009 | 303.00 | 303.000 | | | | | | | | |
| 2 | 1.009 | 303.00 | 299.970 | 0.000 | | Heat Rate= | 10044.8 kJ/(kW*h) | | | | |
| 3 | 0.999 | 463.58 | 929.907 | 0.137 | | Therm Eff= | 0.3680 | | | | |
| 31 | 0.999 | 463.58 | 929.907 | | | | | | | | |
| Wf | = 0.009745 kg/s | | | | | | | | | | |
| 35 | 0.968 | 984.89 | 911.309 | | | P35/P3 | = 0.98000 | | | | |
| 4 | 0.976 | 1285.80 | 874.857 | 0.340 | | P7/P5 | = 0.98000 | | | | |
| 41 | 1.006 | 1276.23 | 874.857 | 0.246 | | εNOx | = 1.57043 | | | | |
| 49 | 1.006 | 1041.06 | 325.131 | 0.599 | | XMB | = 0.1596 | | | | |
| | | | | | | A9 | = 0.0065 m² | | | | |
| 5 | 1.006 | 1041.06 | 325.121 | | | P8/Ps8 | = 1.00000 | | | | |
| 6 | 1.006 | 1041.06 | 315.367 | | | W8id/W2 | = 0.00000 | | | | |
| 7 | 1.006 | 529.95 | 309.060 | | | | | | | | |
| 8 | 1.006 | 529.95 | 309.060 | 0.449 | | | | | | | |
| Bleed | 0.010 | 303.00 | 299.970 | | | P2/P1 | = 0.99000 | | | | |

| | W | T | P | Wfuel | | | | | |
|---|---|---|---|---|---|---|---|---|---|
| Station: | kg/s | K | kPa | kg/s | | PMSD | = | 128.9 kW | |
| amb | | 303.00 | 303.000 | | | Ps8 | = | 303.000 kPa | |
| Ps0-P2= 3.030 | | | Ps8-Ps0= 0.000 | | | PMSD | = | 0.03000 | |
| Efficiencies: Isentr polytr RNI P/P | | | | | | W_NGV/W2 | = | 0.03000 | |
| Compressor | 0.7600 0.7942 2.789 3.100 | | | | | WCL/W2 | = | 0.00000 | |
| Burner | 0.9950 | | 0.980 | | | Loading | = | 100.00 % | |
| Turbine | 0.8650 0.8501 1.513 2.691 | | | | | e45 th | = | 0.86412 | |
| Heat Exch. | 0.9500 | | | | | | | | |
| Generator | 0.9500 | | | | | PW_gen | = | 122.5 kW | |
| Spool mech Eff 0.9950 Nom Spd 80000 rpm P6/P5 = 0.97700 | | | | | | | | | |

| hnum [N] | warf0 | FHV | Fuel |
|---|---|---|---|
| 60.0 | 0.00534 | 49.736 | Natural Gas |

RECONFIGURABLE HYBRID SOLAR GAS TURBINE SYSTEM OPERATING IN A SEMI-OPEN CYCLE

FIELD OF THE INVENTION

The invention relates to a hybrid solar gas turbine having a semi-open cycle.

BACKGROUND

In a typical open-cycle gas turbine, the input gas is ambient air, and the exhaust gas from the turbine is returned to the ambient air. In a closed-cycle gas turbine, gas circulates continuously within the system, and exhaust gas from the turbine is sucked back into a compressor. In this case, to avoid contamination of the gas by combustion products, heat is introduced indirectly into the gas, by thermal conduction from an external combustor.

One advantage of a closed-cycle gas turbine is a very high output power, because the internal gas pressure can be made as high as structural limitations permit. A disadvantage of a closed-cycle gas turbine is the large volume of the external combustor, which usually incorporates a steam turbine cycle for the exhaust gas. Another disadvantage is high external pollution.

A semi-open cycle gas turbine system typically consists of two cycles operating in parallel: an open-cycle turbocharger (TC), which receives fresh inlet air, and a high pressure, recuperated closed-cycle gas turbine engine, in which exhaust gas from a burner is recirculated and combined with compressed air from the TC. Recirculation of the exhaust gas greatly reduces the amount of inlet airflow to the TC that is needed to produce a desired output power. In addition, reburning of the exhaust gas reduces the amount of pollutants, such as nitrous oxides (NOX) and carbon monoxide (CO) in the exhaust gas.

The addition of a clean energy source, such as solar energy, to form a hybrid solar gas turbine system which operates in a semi-open cycle is advantageous for several reasons. First, during periods when solar energy is available, the burner requires less conventional fuel, such as natural gas (NG), in order to provide a given output power. This reduces the overall specific fuel consumption (SFC) of the system, in units of fuel mass per kilowatt (kg/kW) of output power. Second, the use of a semi-open cycle greatly reduces the consumption of inlet air, in units of kg of air per kg of fuel burned, and this further reduces the emission of exhaust pollutants to the ambient environment.

However, a hybrid solar gas turbine system is difficult to implement in practice insofar as solar energy is not a continuous energy source—there is no energy at night, cloud cover may reduce the solar energy during the day, and there are large seasonal variations in solar irradiance. Therefore, a hybrid system must be reconfigurable in real time so that the system can operate in any one three regimes: using only solar energy, using only conventional fuel, and using a combination of both solar energy and conventional fuel. Furthermore, the key elements of a reconfigurable hybrid system, for example a turbocompressor, burner, and recuperator, must be able to operate over a wide range of mass flow, temperature and pressure parameters.

SUMMARY OF THE INVENTION

The proposed invention provides a technical solution for incorporating solar energy into a reconfigurable gas turbine system operating in a semi-open cycle.

According to one aspect of the presently disclosed subject matter, there is provided a reconfigurable hybrid solar gas turbine system including a turbocharger (TC) having a TC compressor (C1) and a TC turbine (T1) which are connected by a first turboshaft aligned along a first axis (X1); a gas turbine engine having an engine compressor (C2) and an engine turbine (T2) which are connected by a second turboshaft aligned along a second axis (X2); and a solar energy module including a solar collector (SC1). The gas turbine engine further includes a burner (B1), a mixer (M1), an engine generator (G2) and a flow control valve. The system operates in a semi-open cycle, in which the TC receives inlet air from an ambient environment and emits exhaust gas to the ambient environment; the burner (B1) receives a pressurized air mass flow from the TC and an input fuel mass flow; the burner (B1) is in fluid communication with the mixer (M1) and with the flow control valve; the mixer combines a first flow of hot gas from the burner (B1) and a second flow of hot gas from the solar energy module to form a combined gas flow; the engine turbine (T2) receives the combined gas flow from the mixer and uses engine generator (G2) to produce electrical power; the flow control valve is in fluid communication with the solar energy module; and a position of the flow control valve determines a mass flow mixing ratio between the first and second flows of hot gas thereby reconfiguring the system in response to fluctuations in solar irradiance received by the solar collector (SC1).

According to some aspects, the mass flow mixing ratio is adjusted to maintain a constant system output power.

According to some aspects, the gas turbine engine further includes a recuperator (R1) which is in fluid communication with the burner (B1) and with the second turbine (T2).

According to some aspects, the recuperator (R1) is in fluid communication with the TC.

According to some aspects, the solar energy module further comprises a solar recuperator (R2) and a heat-exchange fluid which flows between the solar collector (SC1) and the solar recuperator (R2).

According to some aspects, the heat-exchange fluid is pressurized helium gas.

According to some aspects, the solar recuperator is in fluid communication with the TC turbine (T1) through a solar control valve.

According to some aspects, the flow control valve and the solar control valve are used in combination in order to maintain a constant engine speed-to-power ratio.

According to some aspects, the engine includes a cooling heat exchanger (HX1) for reducing a temperature of the pressurized air mass flow from the TC.

According to some aspects, the cooling heat exchanger (HX1) uses air or water as a heat-exchange fluid.

According to some aspects, an output power of the engine turbine (T2) is inversely proportional to a temperature of the pressurized air mass flow entering the engine compressor (C2).

According to some aspects, the system also includes a heat exchanger which has a cold water input and which generates hot water.

According to some aspects, the semi-open cycle enables a reduction in the amount of one or more pollutants in the exhaust gas emitted by the system, as measured by one or more emission indices at a specified output power.

According to some aspects, an electrical efficiency, as defined by a ratio between the output electrical power and the input fuel power, is increased by reconfiguring the system in response to fluctuations in the solar energy irradiance received by the solar collector (SC1).

According to some aspects, the flow control valve is in communication with a sensor which measures a temperature and/or a mass flow rate of the combined gas flow into the engine turbine (T2).

According to some aspects, the TC generator (G1) is configured to provide a source of electrical power and/or to assist a TC startup operation.

According to some aspects, a mass flow rate of air entering the burner (B1) is approximately 25% of a mass flow rate of gas exiting the burner (B1).

According to some aspects, the fuel input is natural gas (NG).

BRIEF DESCRIPTION OF THE DRAWINGS

The invention is described herein, by way of example only, with reference to the accompanying drawings, wherein:

FIG. 2 is a table of exemplary numerical results obtained from a computational fluid dynamics and thermodynamics simulation of the embodiment of FIG. 1.

DETAILED DESCRIPTION

The proposed invention is a reconfigurable hybrid solar gas turbine system operating in a semi-open cycle.

Figure 1:
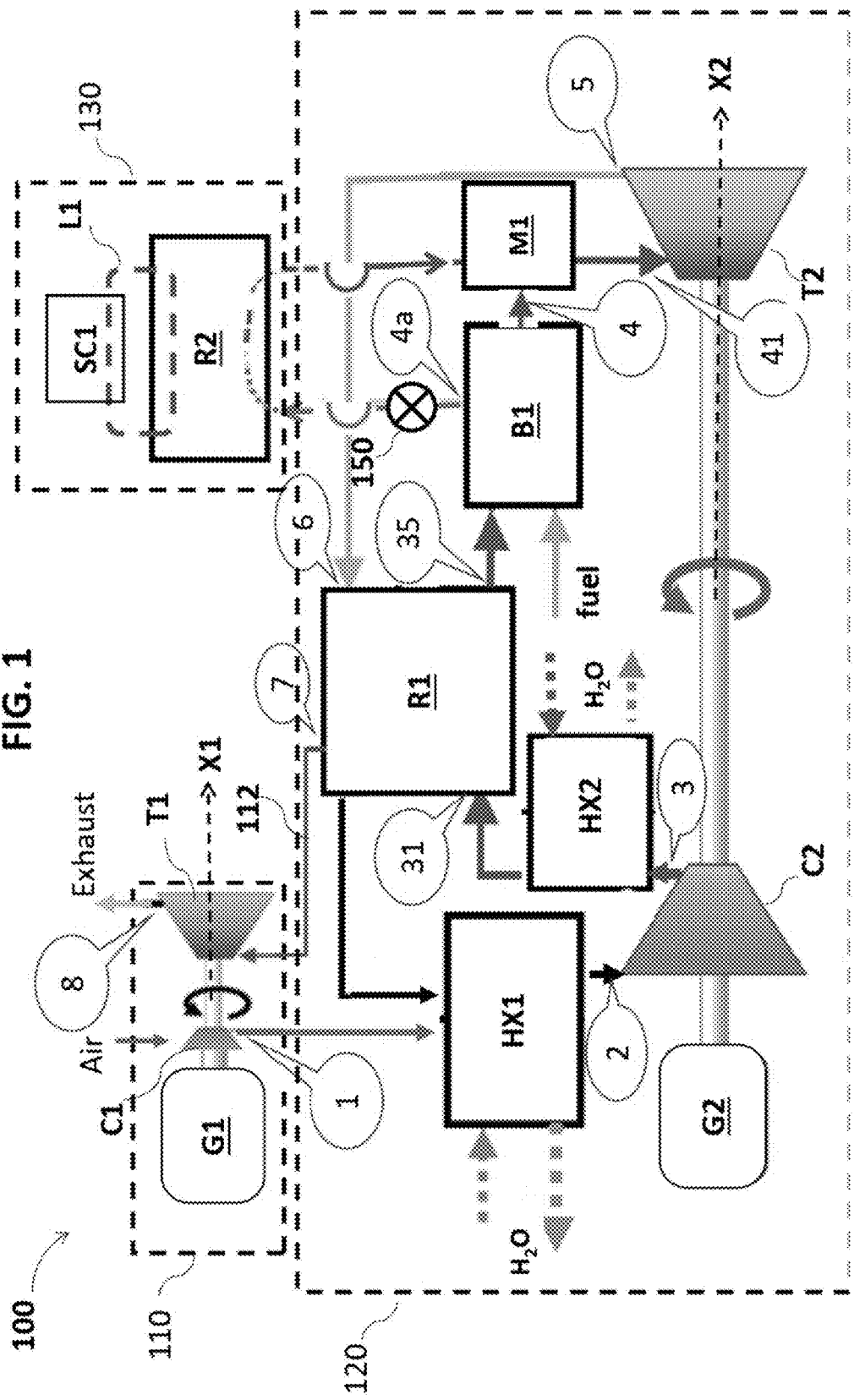
FIG. 1 is a schematic of an exemplary hybrid semi-open cycle solar gas turbine system, according to a first embodiment of the present invention, in which solar hot air is transmitted from a solar recuperator to a mixer.

FIG. 1 shows a schematic of an exemplary hybrid semi-open cycle solar gas turbine system 100, according to a first embodiment of the present invention. Turbocharger (TC) 110 includes a compressor C1 and turbine T1, which are joined by a turboshaft aligned with an axis X1. The TC receives input air from, and emits exhaust gas to, the ambient environment. The TC also provides a pressurized air input to a main gas turbine engine 120. The TC is powered by a hot air flow 112 which is energized by the main gas turbine engine 120 and/or a solar energy module 130. The TC enables the hybrid semi-open cycle system to achieve thermal and electrical power outputs as high as those of a closed-cycle system.

In FIG. 1, the TC is shown as including a TC generator G1. The purpose of this generator is twofold: (a) to supply another source of electrical power in addition to that provided by the main gas turbine engine 120, and (b) to assist the TC during startup operation. However, in another embodiment of the system 100, the TC does not include a generator G1.

Engine 120 includes for example a cooling heat exchanger HX1 a recuperator R1, a burner (or combustor) B1, a mixer M1, and an engine compressor C2 and an engine turbine T2 which are joined by a turboshaft aligned with an axis X2. HX1 cools the air flowing into C2. HX1 and an optional second heat exchanger (HX2) provide output energy in the form of hot water. HX1 and HX2 typically use air or water as the heat-exchange fluid. Engine 120 generates electrical power using engine generator G2. Compressor C2 boosts the air pressure from, for example, 3 bar at the compressor inlet to 9 bar at the compressor outlet. The pressurized airflow is indicated by the arrows linking C2, HX2, R1, and burner B1.

The fuel input to burner B1 is, for example, natural gas (NG). The thermal energy (enthalpy) of the compressed hot air flowing into burner B1 enables a reduction in the air mass flow rate needed for complete combustion of the fuel. For example, for airflow at a temperature of 1000° K and a pressure of 9 bar, complete combustion of NG is achieved in burner B1 when the mass flow rate of air entering B1 is approximately 25% of the mass flow rate of gas exiting B1. By reducing the airflow, there is a proportionate reduction in the amount of NOX and CO pollutants released to the ambient environment, which is a key advantage of the semi-open cycle system.

Solar energy module 130 includes a solar collector SC1 and a solar recuperator R2, which are thermally connected by a heat transfer loop L1. The heat transfer fluid flowing in loop L1 may be, for example, pressurized air or helium. Typically, a helium-based loop can use less fluid and be more compact than an air-based loop, because the specific heat, $C_p$, of helium is approximately five times greater than that of air. An exemplary heat transfer loop L1 for solar energy module 130 uses helium at a temperature of 1300° K, a gauge pressure of 10 bar, and a helium mass flow rate of 1 kg/sec. The solar recuperator R2 delivers hot air to mixer M1, where it combines with the hot exhaust gas from burner B1. The total mass flow rate of the hot gas flowing from mixer M1 to turbine T2 is equal to the sum of the separate mass flow rates from the burner B1 and the solar energy module 130. The ratio of the latter two separate mass flow rates is referred to as a "mass flow mixing ratio".

The solar collector SC1 consists, for example, of 12 dish receivers, providing a total collection area facing the sun of about 102 meters. For a maximum solar irradiance of 1 kW per square meter, the maximum solar power input is thus 102 kW.

Flow control valve 150 reconfigures the system in response to variations in solar irradiance, by adjusting the mass flow mixing ratio. When solar energy is unavailable, at night for example, flow control valve 150 is closed. In this case, all of the output energy, in the form of electricity and hot water, is provided by burning fuel in burner B1. Conversely, when solar energy is abundant, flow control valve 150 is opened, and some, if not all, of the output energy is provided by the sun. During times of partial sun, the flow control valve would be set in a partly open position. By using the flow control valve 150, the output power may be maintained constant at a desired level, despite fluctuations in the solar irradiance. In another embodiment of the system 100 in FIG. 1, the position of flow control valve 150 is adjusted in response to a mass flow and/or a temperature sensor placed at the inlet to turbine T2.

In FIG. 1, the numbers inside call-out bubbles (⬭) indicate station points used in a numerical simulation of the system. The station numbers and their locations inside the system are explained in TABLE 1.

TABLE 1

| Station # | System Location |
|---|---|
| 1 | C1 outlet to HX1 |
| 2 | C2 compressor inlet from HX1 |
| 3 | C2 compressor outlet to HX2 |
| 4 | B1 combustor outlet to M1 |
| 4a | B1 combustor outlet to R2 |
| 5 | T2 turbine outlet |
| 6 | R1 recuperator hot inlet from T2 |
| 7 | R1 recuperator hot outlet to T1 |
| 8 | T1 outlet to ambient (exhaust) |
| 31 | R1 recuperator cold inlet from HX2 |
| 35 | R1 recuperator outlet to B1 |
| 41 | T2 turbine inlet |

FIG. 2 shows a table of exemplary numerical results obtained from a computational fluid dynamics (CFD) and thermodynamics simulation of the semi-open cycle system of FIG. 1. The simulation uses TURBOGAS 11 C simulation software by J. Kurkzke. In the simulation, the airflow out of compressor C1 (at station point 1) has a mass flow rate of approximately 1 kg/sec and a relative humidity is 60%. Compressor C2 increases the air pressure from 299.97 kilo-Pascal (kPa) at the inlet to C2 (at station point 2) to 929.907 kPa at the outlet of C2 (at station point 3), corresponding to a compression ratio slightly greater than three. Recuperator R1 increaes the air temperature from 453.58° K at the inlet (at station point 31) to 911.309° K at the outlet (at station point 35). The mass flow rate of NG fuel into burner B1, denoted by WF, is 0.00745 kg/sec. The engine 120 has a CO Emission Index (EIco) of 1.08 grams (gr) per kg. of fuel. Engine 120 generates 122.5 kW of electrical power and 250 kW of heat power (e.g. in the form of hot water), corresponding to a total thermal efficiency of 34.8%. This efficiency is achieved when there is no solar energy input, e.g. when the solar irradiance is zero.

The following table shows the output electrical and heating powers and the NOX and CO emissions of the reconfigurable hybrid solar gas turbine system operating in a semi-open cycle, for various combinations of NG fuel energy and solar energy.

TABLE 2

| Fuel | NG Mass Flow (gm/sec) | Electrical Power kW | Electrical Efficiency % | Heating Power kW | EInox gm/kg | EIco gm/kg |
|---|---|---|---|---|---|---|
| NG only | 7.45 | 122 | 34.8 | 250 | 5.0 | 1.08 |
| Solar only | 0 | 102 | — | 220 | 0 | 0 |
| NG + Solar | 3.72 | 116 | 68 | 235 | 2.4 | 0.54 |
| NG + Solar | 7.45 | 162 | 52 | 325 | 5.0 | 1.08 |

In Table 2, the electrical efficiency in percent is calculated by dividing the output electrical power by the input power of the NG fuel, not including the input power of the solar energy. The electrical efficiency shown as "--" on the second line, corresponding to "Solar only", is essentially infinite because the NG input power is zero in this case.

Figure 3:
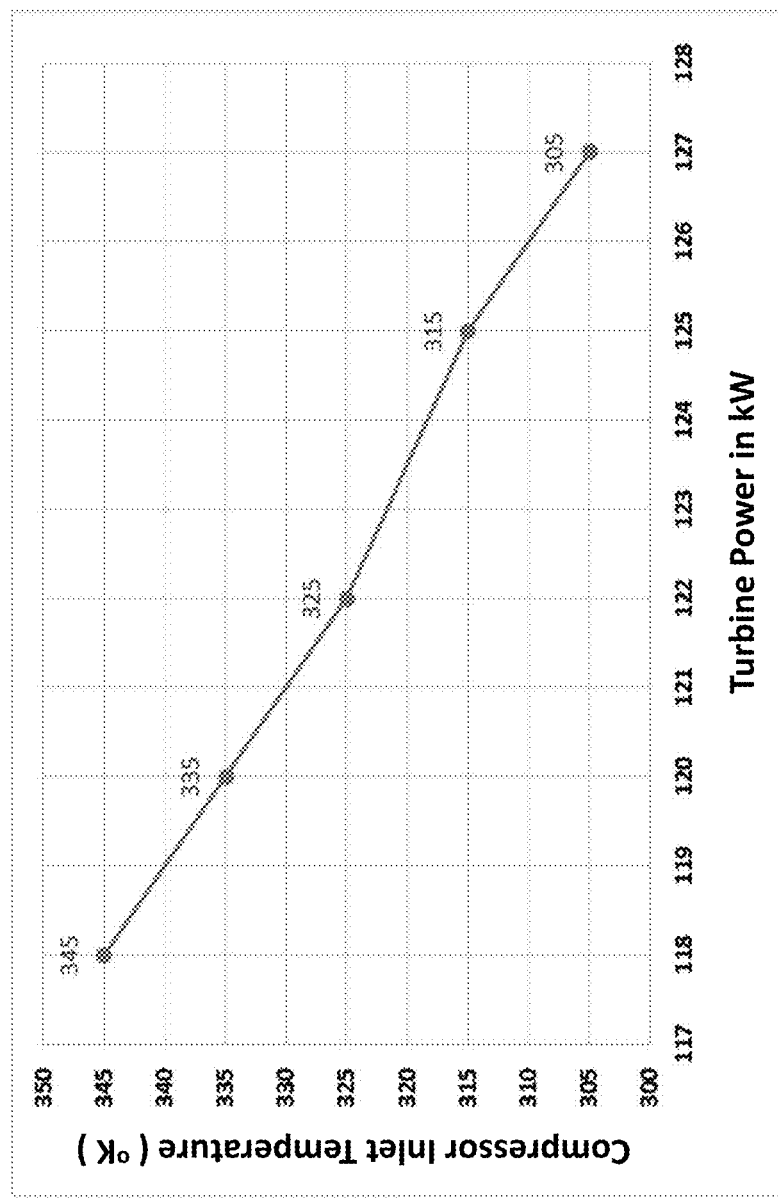
FIG. 3 is an exemplary graph showing the effect of compressor inlet temperature on gas turbine power, according to the embodiment of FIG. 1.

FIG. 3 is an exemplary graph showing the effect of compressor C2 inlet temperature, in ° K on the vertical axis, on the turbine T2 output power, in kW on the horizontal axis, for the embodiment of FIG. 1. The points on the graph indicate that the turbine output power increases from 118 kW to 127 kW, as the temperature at the compressor C2 inlet is reduced from 345° K to 305° K. That is, the output power is inversely proportional to the temperature of the pressurized air mass flow entering compressor C2. This demonstrates the utility of incorporating HX1 as an intercooler, in order to increase the turbine output power by cooling the airflow into compressor C2.

Figure 4:
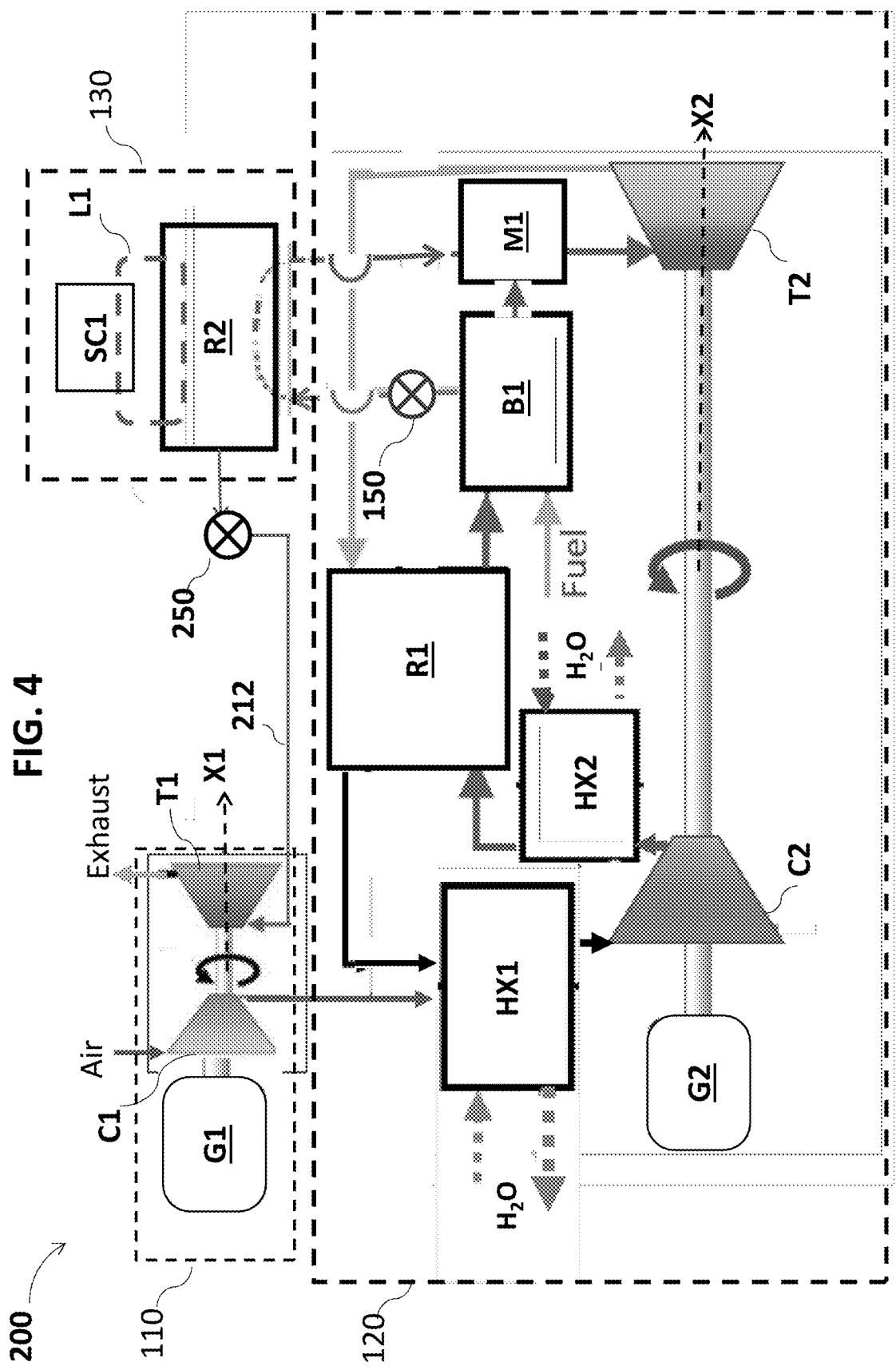
FIG. 4 is a schematic of an exemplary hybrid semi-open cycle solar gas turbine system according to a second embodiment of the present invention, in which solar hot air is transmitted from a solar recuperator to a mixer and to a turbocharger.

FIG. 4 is a schematic of an exemplary hybrid semi-open cycle solar gas turbine system 200 according to a second embodiment of the present invention, in which solar energy is transmitted from the solar recuperator R2 both to mixer M1 and to turbine T1 of the turbocharger via solar control valve 250 and hot airflow path 212. The ratio of the two flows is controlled by the settings of the flow control valve 150 and the solar control valve 250. For example, when valve 250 is open and valve 150 is closed, all of the hot air from the solar energy module 130 flows to turbine T1. Conversely, when valve 250 is closed and valve 150 is open, all of the hot air from the solar energy module 130 flows to mixer M1. The two control valves may also be used in combination to maintain a constant speed-to-power ratio of engine 120.

The TC generator G1 fulfills the same functions as it does in system 100 of FIG. 1. However, in another embodiment of the system 200 shown in FIG. 4, the TC does not include a generator G1.

Figure 5:
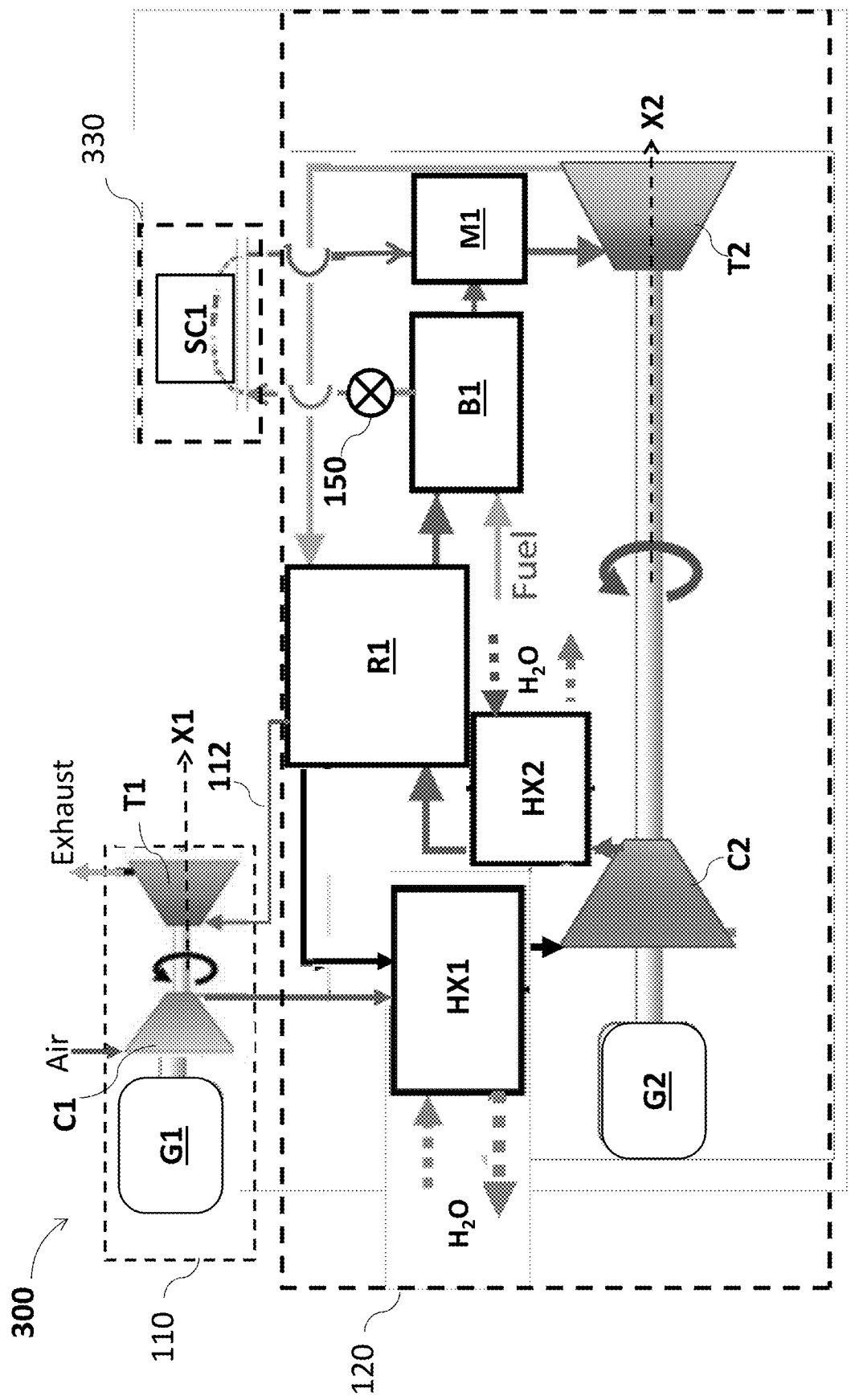
FIG. 5 is a schematic of an exemplary hybrid semi-open cycle solar gas turbine system according to a third embodiment of the present invention, having a non-recuperated solar energy module.

FIG. 5 is a schematic of an exemplary hybrid semi-open cycle solar gas turbine system 300 according to a third embodiment of the present invention, having a non-recuperated solar energy module 330. In module 330, there is no heat transfer loop to a recuperator, and hot air from the solar collector SC1 flows directly to mixer M1. In FIG. 5, the control valve 150 operates in the same manner as in the first embodiment of FIG. 1.

Another embodiment of the system 300 in FIG. 5 may include a control value 250 and a hot airflow path connecting the solar energy module 330 with turbine T1. In this case, control valves 150 and 250 operate in the same manner as in the system 200 of FIG. 4.

The TC generator G1 fulfills the same functions as it does in system 100 of FIG. 1. However, in yet another embodiment of the system 300 shown in FIG. 5, the TC does not include a generator G1.

Although the invention has been described in conjunction with specific embodiments, it is evident that many alternatives, modifications, and variations will be apparent to those skilled in the art. Accordingly, the invention is intended to embrace all such alternatives, modifications, and variations that fall within the spirit and broad scope of this disclosure.

The invention claimed is:

1. A reconfigurable hybrid solar gas turbine system comprising:
   a turbocharger (TC) comprising a TC compressor (C1) and a TC turbine (T1) which are connected by a first turboshaft aligned along a first axis (X1);
   a gas turbine engine comprising an engine compressor (C2) and an engine turbine (T2) which are connected by a second turboshaft aligned along a second axis (X2); and a solar energy module comprising a solar collector (SC1); wherein the gas turbine engine further comprises a burner (B1), a mixer (M1), an engine generator (G2) and a flow control valve; and the system operates in a semi-open cycle, in which the TC receives inlet air from an ambient environment and emits exhaust gas to the ambient environment;

the burner (B1) receives a pressurized air mass flow from the TC and an input fuel mass flow;

the burner (B1) is in fluid communication with the mixer (M1) and with the flow control valve;

the mixer combines a first flow of hot gas from the burner (B1) and a second flow of hot gas heated by solar energy collected by the solar collector (SC1) to form a combined gas flow;

the engine turbine (T2) receives the combined gas flow from the mixer, and engine generator (G2) produces electrical power;

the flow control valve is in fluid communication with the solar energy module; and a position of the flow control valve determines a mass flow mixing ratio between the first and second flows of hot gas thereby reconfiguring the system in response to fluctuations in a solar irradiance received by the solar collector (SC1).

2. The system of claim 1 wherein the mass flow mixing ratio is adjusted to maintain a constant system output power.

3. The system of claim 1 wherein the gas turbine engine further comprises a recuperator (R1) which is in fluid communication with the burner (B1) and with the second turbine (T2).

4. The system of claim 3 wherein the recuperator (R1) is in fluid communication with the TC.

5. The system of claim 1 wherein the solar energy module further comprises a solar recuperator (R2) and a heat-exchange fluid which flows between the solar collector (SC1) and the solar recuperator (R2).

6. The system of claim 5 wherein the heat-exchange fluid is pressurized helium gas.

7. The system of claim 5 wherein the solar recuperator is in fluid communication with the TC turbine (T1) through a solar control valve.

8. The system of claim 6 wherein the flow control valve and the solar control valve are used in combination in order to maintain a constant engine speed-to-power ratio.

9. The system of claim 1 wherein the engine comprises a cooling heat exchanger (HX1) for reducing a temperature of the pressurized air mass flow from the TC.

10. The system of claim 8 wherein the cooling heat exchanger (HX1) uses air or water as a heat-exchange fluid.

11. The system of claim 8 wherein an output power of the engine turbine (T2) is inversely proportional to a temperature of the pressurized air mass flow entering the engine compressor (C2).

12. The system of claim 1 further comprising a heat exchanger which has a cold water input and which generates hot water.

13. The system of claim 1 wherein the semi-open cycle enables a reduction in the amount of one or more pollutants in the exhaust gas emitted by the system, as measured by one or more emission indices at a specified output power.

14. The system of claim 1 wherein an electrical efficiency, as defined by a ratio between the output electrical power and the input fuel power, is increased by reconfiguring the system in response to fluctuations in the solar irradiance received by the solar collector (SC1).

15. The system of claim 1 wherein the flow control valve is in communication with a sensor which measures a temperature and/or a mass flow rate of the combined gas flow into the engine turbine (T2).

16. The system of claim 1 further comprising a TC generator (G1) which is configured to provide a source of electrical power and/or to assist a TC startup operation.

17. The system of claim 1 wherein a mass flow rate of air entering the burner (B1) is substantially equal to 25% of a mass flow rate of gas exiting the burner (B1).

18. The system of claim 1 wherein the input fuel mass flow comprises natural gas (NG).

* * * * *